United States Patent [19]

Acker et al.

[11] Patent Number: 4,942,956
[45] Date of Patent: Jul. 24, 1990

[54] PART INDEXING AND POSITIONING APPARATUS

[75] Inventors: John N. Acker; Bradley M. Andreae, both of Sturgeon Bay, Wis.

[73] Assignee: Therma-Tron-X, Inc., Sturgeon Bay, Wis.

[21] Appl. No.: 298,473

[22] Filed: Dec. 30, 1988

[51] Int. Cl.$^5$ .............................................. B65G 37/00
[52] U.S. Cl. ................... 198/465.3; 198/681; 198/687; 198/803.2; 198/832.3; 104/162; 104/172.4
[58] Field of Search .............. 198/346.1, 346.3, 465.3, 198/465.4, 803.01, 803.2, 468.6, 486.1, 487.1, 680, 681, 683, 685, 687, 859, 740, 742; 104/162, 172.4; 414/750

[56] References Cited

U.S. PATENT DOCUMENTS

| | | | |
|---|---|---|---|
| 2,908,378 | 10/1959 | Brown et al. | 198/859 |
| 2,943,726 | 7/1960 | Granath | 198/859 |
| 3,208,600 | 9/1965 | Bignall et al. | 198/465.4 |
| 4,462,315 | 7/1984 | Wakabayashi | 198/465.4 |

FOREIGN PATENT DOCUMENTS 2043569 10/1980 United Kingdom ............. 198/465.4

*Primary Examiner*—Joseph E. Valenza
*Attorney, Agent, or Firm*—Andrus, Sceales, Starke & Sawall

[57] ABSTRACT

A series of rigid I-beams are secured to the underside of a driven endless looped chain and supported by a leading trolley and a trailing fixed connector. The chain is supported in a track by trolleys. End hooks on the beam support a load crossbar. A drive and brake assembly includes a reciprocating drive unit having a rail with a drive member sliding therein. The rail is mounted adjacent the chain and includes an inverted U-shaped arm pivotally mounted with the rail at one end. The slide has coupling fingers spaced in accordance with the chain links. A cylinder is coupled to the rail support and pivots the rail and slide member to selectively engage the chain link. A brake member secured to the U-shaped arm opposite side of the rail and has locking fingers spaced corresponding to the chain links. Pivoting of the rail to engage the slide member disengages the brake member to move the chain unit. Alternately, the brake member is engaged and the drive member disengaged and reset with positive alignment to the chain unit. A drive cylinder unit is secured to the rail and coupled to reciprocate the slide member. Alternately, parallel support units are connected by a load carrier for corresponding movement connected to trolleys moving along a track. A drive and brake assembly for each support unit includes a rail and slide and a brake pivotally mounted to the opposite side of tracks and trolleys. Both rails and brakes are mechanically coupled to a single cylinder for appropriate timed and alternate engagement of the drive to the trolleys to move the load one step and of the brake to hold the trolleys for resetting the slide unit.

15 Claims, 5 Drawing Sheets

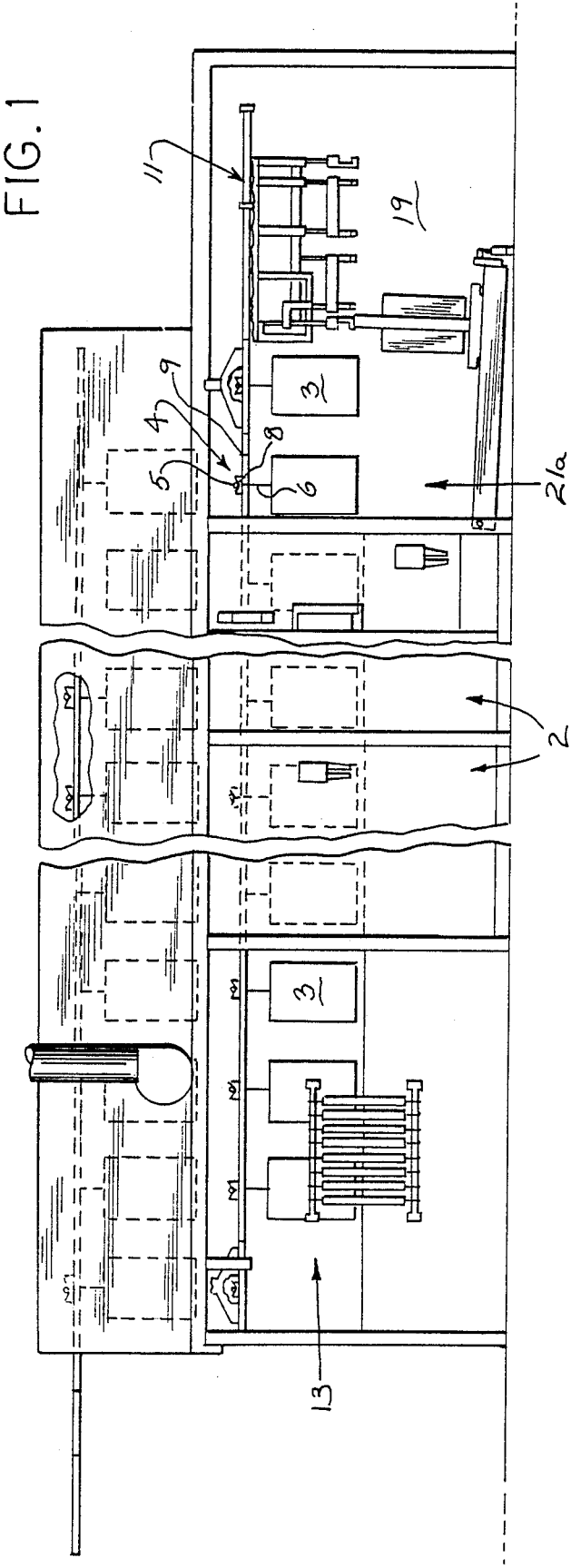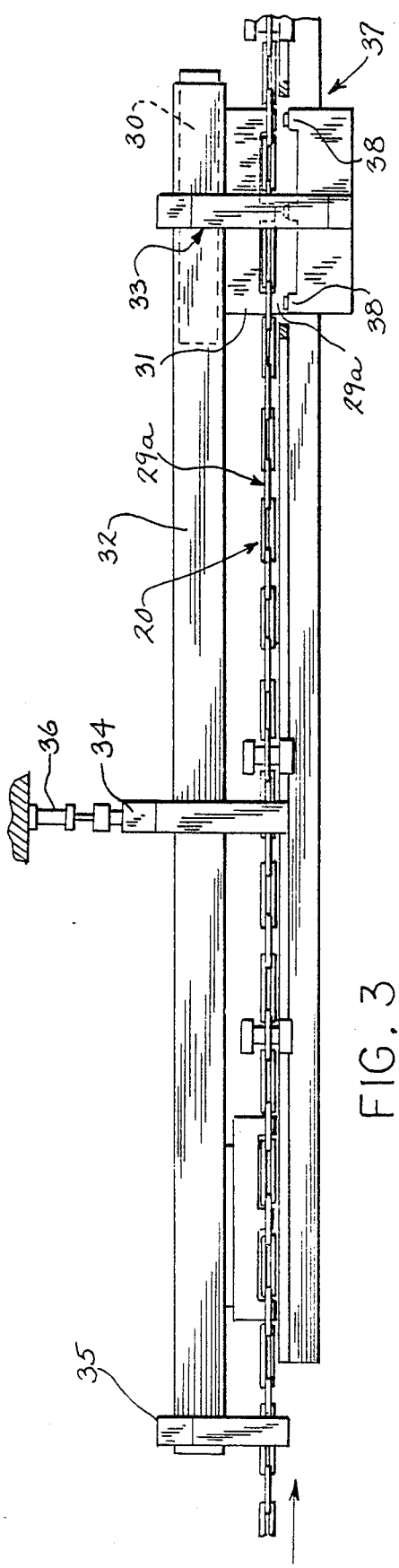

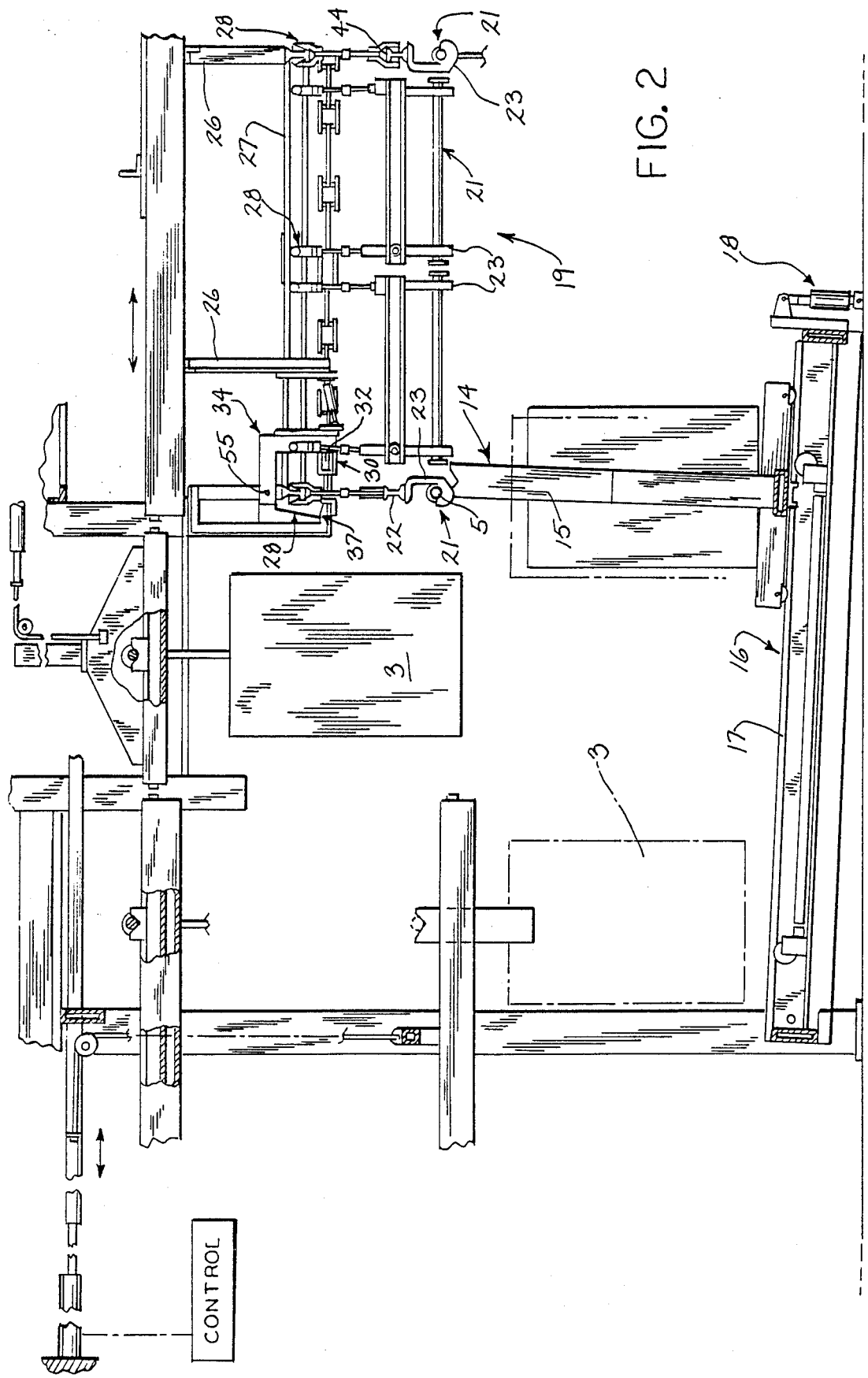

PART INDEXING AND POSITIONING APPARATUS

Cross-Referenced Applications

An application entitled "Intermittent Work Conveying Apparatus" filed on even date herewith and assigned to a common assignee herewith, is cross-referenced in this application.

Background Of The Present Invention

This invention relates to a part indexing apparatus and particularly to such apparatus for sequentially positioning of parts into alignment with a part interchange apparatus.

In the processing of a series of work components or broadly parts, sequential movement of the parts into a given or particular location along the path of an endless transport conveyor may be required in the overall design of a system. The transport conveyor may use a step drive mechanism. For example, a driven chain and drive means are coupled and decoupled to provide a stepped motion of the chain. The drive system may be sequentially energized and deenergized to provide corresponding positioning of the part. A typical example is disclosed in the co-pending application previously identified wherein an electrocoating system is disclosed preferably requiring automatic loading and unloading of the parts to be coated. The parts are carried in that system through a series of processing and working stations in a stepped sequence with each part held in each working station for a like period of time. During the dwell working period, a finished part is removed from the coating system and replaced with an unfinished part. The parts can be relatively heavy particularly where a part of the conveying mechanism is used to remove a finished part and to add an unfinished part.

In such cyclically operable systems, the work or parts are often manually loaded or involve automated load devices required significant personnel involvement. Where a relatively short work cycle is involved, the number of personnel required or the effort of a limited personnel has created difficulty in establishing and maintaining an efficient, low cost operation of the system.

There is therefore a demand for a system to provide automated conveyor or transport apparatus which includes temporary storage of unfinished and finished parts to be sequentially added into another cylcically operated system to permit convenient, efficient and economic handling of the unfinished and finished parts.

Summary Of The Present Invention

The present invention is particularly directed to a transport system and apparatus employing an endless conveyor which is actuated in stepped sequence to provide for transport and transfer of parts from and to an initial source location for loading and unloading of finished and unfinished parts at a spaced transfer station and for the automated transfer of finished and unfinished parts from another system such as a work or process system. Generally, in accordance with the present invention, the transport system or apparatus includes an endless driven unit having a plurality of circumferentially spaced load support units each of which has a corresponding length related to the maximum length of a part and the required movement for placement of a part into and from a transfer station and holding the part in place for transfer at the transfer station. A reciprocating stepping drive mechanism or unit is releasably coupled to the driven unit and is operable to move in a forward and reverse direction corresponding to the stepped movement of the load support units. In addition to the releasable drive connection, a separate brake mechanism is releasably coupled to the driven unit and is operable to hold the driven unit in fixed relation during the release and the resetting or retracting of the drive unit. By appropriate timed actuation of the drive unit and of the brake unit, the chain unit engages the driven unit with the brake unit disengaged, moves the driven unit forward the desired distance to insert a new load unit, releases with automated setting of the brake unit and then automatically retracts to the initial start or stand-by position. The brake unit associated with the driven unit is fixed at the transfer station and is released in synchronism with the forward drive actuation of the drive unit and set to the brake position in synchronism with the release of the drive unit from the driven unit at the end of the forward drive and prior to initiating of the retracting movement.

In a unique and particularly practical construction and feature of the present invention, the driven unit is a chain or similar endless member supported for movement in a desired encircling path. A series of elongated and rigid load support units are mounted by suitably movable supports in an encircling track and are secured to and depend from the chain. The chain is a link chain having lateral openings. A drive and brake assembly includes a plurality of spaced and pivotally mounted rail support devices located at the transfer station. A slide member is mounted in a rail secured to the rail support units and moves parallel to the path of the chain. The pivotally mounted slide rail is thus secured to the one side of the driven unit at the transfer location and a brake unit is connected to the rail support units to the opposite side of the rail. The slide member includes drive connecting pins or fingers which project into the chain linkage to provide forward transport of the chain structure with the rail in a first pivot position of the rail and which are released from the chain in a second pivot position. Similarly, the brake unit includes pins or fingers which are selectively introduced into and from the chain linkage to lock the chain against movement and thereby hold the transport member in the desired position.

In one system for an electrocoating line, the apparatus included a series of rigid I-beams to the underside of the driven chain, and each beam had a length slightly longer than the length of a load carrier member for each part. Each beam included a leading pivoted trolley support to permit relative movement between the beam and chain for cornering movement of the beam and rigid, pivotal trailering chain connections. Each beam included a pair of end located hooks opening toward a transfer side of the apparatus. Three support units are mounted for the drive and brake assembly and longitudinally spaced along the length of the transfer station. A middle support unit includes an L-shaped arm pivotally secured having a pivotally mounted horizontal arm and a depending rail arm located to the inside of the encircling chain. A leading or a similar L-shaped support unit is pivotally secured to the upstream end of the transfer station with a depending arm projecting downwardly below the chain unit and above the load carrier beam. An inverted U-shaped support unit is mounted at the downstream end of the transfer station. The U-shaped support unit includes a top pivotally mounted horizontal arm. A depending rail arm extend downwardly pass the chain unit in planar relationship with the upstream L-shaped rail arm. Each of the rail arms is notched to receive a rectangular rail having a slot opening facing and aligned with the chain movement through the transfer station. The slide member is slidably mounted in the rail and includes a plurality of coupling fingers projecting outwardly toward the chain. The fingers are spaced in accordance with the spacing of the chain links and upon appropriate alignment can move into the chain links to couple the slide member to the chain. A pivoting unit such as a hydraulic cylinder unit is coupled to the frame structure and to the rail for pivoting of the total rail assembly and selectively engaging and disengaging the fingers with the chain link. A multifingered brake member is secured to the opposite arm of the U-shaped member to the opposite side of the chain. The brake arm is angled outwardly in accordance with the pivoting of the rail assembly and particularly the U-shaped support unit. Thus, with the U-shaped member pivoted to engage the slide member with the chain, the brake fingers will be pivoted outwardly from the chain unit. Conversely, pivoting of the rail assembly outwardly to release the slide member from the chain simultaneously engages the brake fingers with the chain unit to hold it in place. Thus, with the slide member coupled to the unit to the chain, the chain can be moved. With the brake member engaging the chain, the slide member can be retracted or reset to its initial starting position with assurance that it will align with the chain unit at the initial reset position for the next step. The rail arms of the upstream and downstream support units project downwardly below the chain unit. A drive support plate is secured to the lower ends of the arms. A rodless cylinder mounted on the plate includes opposite end cables looped over suitable pulleys and coupled by a bracket to the slide member. Actuation of the rodless cylinder provides for the desired reciprocating of the slide member in corresponding stepped movement of the chain and the interconnected load support members or beams.

In an alternate embodiment of the invention particularly adapted to particularly wide loads and the like, the drive system includes separate movable support units for each end of the load. The support units move in parallel relation and are connected by a load carrier. Each support unit includes one or more trolley units adapted to be driven along a track system for movement in a linear path. A drive and brake assembly is secured to the structure with a rail and slide unit adapted to engage a drive chain and a brake unit for similar coupling to the drive chain. The slide member units and the brake units are mechanically connected for appropriate timed engagement with the trolley units to move the load one step and to hold the load in fixed position during resetting of the slide unit.

The present invention with the stepped drive of the members provides a highly effective reliable and long-life mechanism for the indexing of parts to a transfer location or the like. The drive system accurately locates the part and further provides for the reliable positioning and engagement of the reciprocating drive member with the endless driven member.

The apparatus is readily constructed for conventional available equipment adapted for use in a manufacturing and working environment. The components can be readily understood by ordinary maintenance and construction personnel and thus is particularly adapted to commercial implementation in various industrial applications.

Brief Description Of The Drawings

The drawings furnished herewith generally illustrate the best mode presently contemplated for carrying out the invention and are described hereinafter.

In the drawings:

FIG. 1 is a side elevational partial view of a coating line, with parts broken away, for simultaneously moving a plurality of aligned parts through a series of work or processing stations and including automated means for interchange of parts into and from the coating line;

FIG. 2 is an enlarged side elevational fragmentary view of the automated apparatus for interchange of parts to the coating line;

FIG. 3 is an enlarged plan view taken generally on lines 3—3 of FIG. 2 of a parts source apparatus and illustrating an indexed conveyor or transport unit for locating of parts for interchange with the coating line shown in FIG. 2;

Description Of The Illustrated Embodiment

Figures 4, 5, 6:
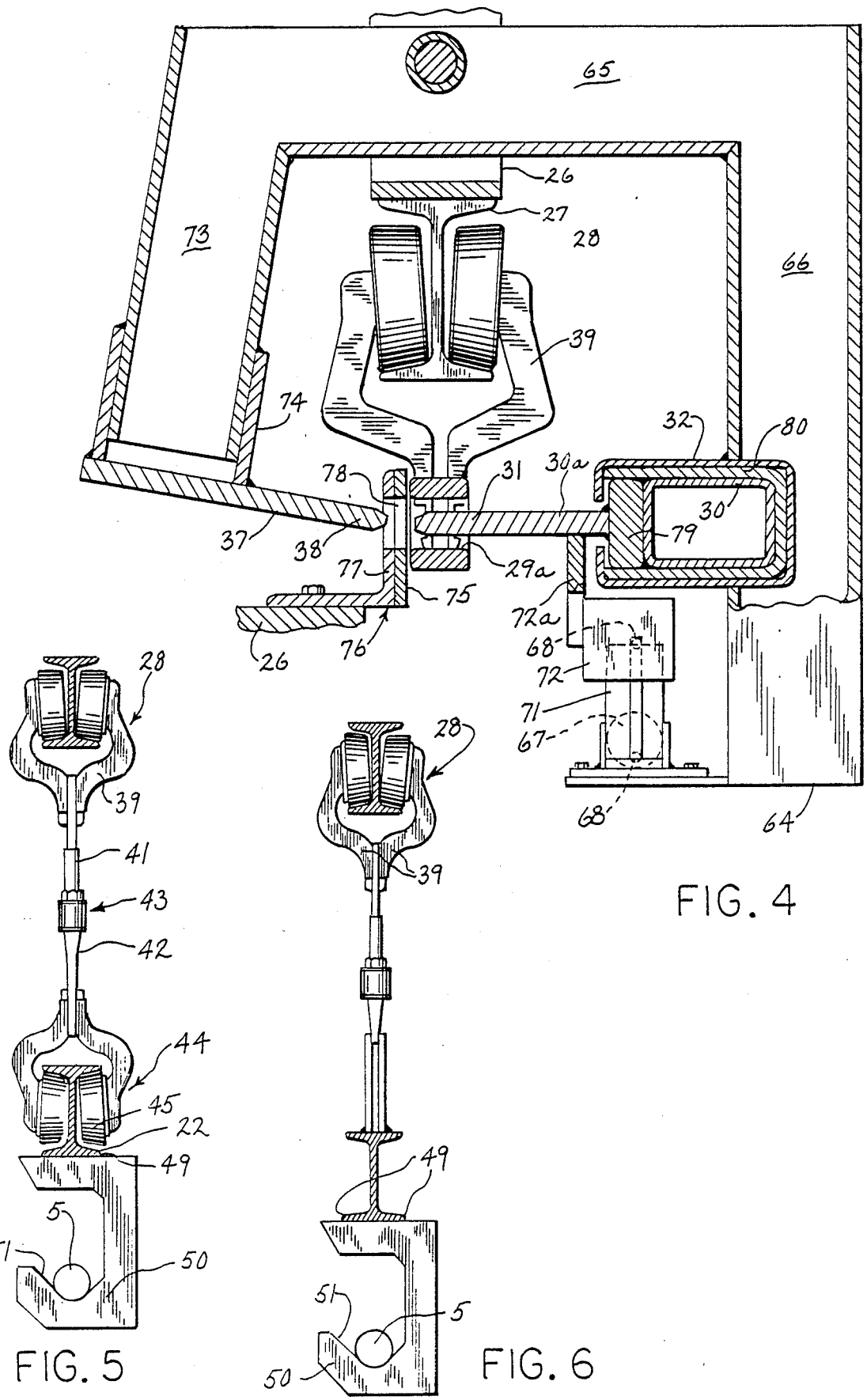
FIG. 4 is an enlarged vertical section taken generally on line 4—4 of FIG. 3.
FIG. 5 is a view showing a trolley and chain support for one end of a load carrier of the transport unit.
FIG. 6 is a view similar to FIG. 5 of the opposite end support.

Referring to the drawings and particularly to FIGS. 1 and 2, an electrocoating line 1 is illustrated including a plurality of work stations 2. The coating line is adapted to coat a series of parts 3 illustrated for purposes of description as plate-like members. The members are supported by a part carrier unit 4 consisting of a laterally extended rod 5 and suspension hooks 6 to which the part 3 is releasably mounted. The coating line 1 includes a slide bar conveyor unit 7, such as that more fully described in the co-pending application.

As most clearly shown in FIG. 2 the slide bar conveyor unit 7 includes a plurality of individual slide bars 8, one for each part 3. The slide bars 8 are elongated slide members slidably mounted in laterally spaced rails 9 of a supporting conveyor rail assembly. The rails have top openings or slots. Support plates 10 are secured to the top side of the slide bars 8 and project upwardly through the slots with the upper ends of the plates having V-shaped openings within which rod 5 is supported. A push unit 11 includes push rods aligned with the upstream end of the rails 9. The push unit 11 is hydraulically actuated and when moved forwardly engages the upstream most slide bar 8 and simultaneously forces it and all downstream engaged successive slide bars forwardly. The stepped movement is related to the fixed distance between the stations 2 to provide successive movement in overlying relation to the stations. The rails 9 are mounted for vertical movement for moving of parts 3 between a raised transport level and lowered work level with the part 3 lowered into the aligned operating or work station 2. The upstream end of the rails 9 are located within a transfer station 13 where the parts 3 are transferred to and from the rails 9. Referring to FIGS. 1 and 2, a generally U-shaped carriage 14 is mounted within the transfer station 13 and includes a pair of upstanding 10 arms 15 projecting upwardly in laterally spaced relation to the vertical plane of movement of the rails 9. The upper ends of the arms 15 are formed with V-shaped openings for receiving of a carrier member rod 5. A rodless hydraulic rodless cylinder and cable unit 16 is coupled to the carriage and operable to move the carriage horizontally on a pair of laterally spaced tracks 17. The outer end of the tracks 17 are coupled to a hydraulic cylinder unit 18 for pivotal movement of the tracks 17 and the carriage 14 in a vertical direction. The tracks 17 extend outwardly from the transfer station 13, and terminate immediately adjacent a load change or source apparatus 19 which particularly forms the subject matter of the present invention.

Generally, the load change apparatus 19, as most clearly shown in FIGS. 1-3, includes an endless driven unit 20, shown as an endless chain unit 20, movable in a generally horizontal plane somewhat above the top level of the carriage arms 15. A plurality of load carrier units 21 are secured to the endless chain unit 20 and moved in a path between the transfer location 13 and a spaced load/unload station 21a. Each of the load carrier units 21 includes a rigid elongated support unit 22, shown as a beam member, having a length somewhat longer than the carrier member rods 5. Depending hook members 23 are secured to the underside of the beams 22 and open outwardly toward carriage 14 to receive and support rods 5 for interchange with the carriage 14. A drive/brake assembly 24 of the change apparatus 19 is mounted for selective coupling to the chain unit 20 to step the chain unit 20 somewhat more than the length of unit 21 and sequentially aligns successive load carrier units 21 with the carriage 14. With unit 22 thus aligned with the carriage 14, the hook members 23 are located in the path of the rod 5 on the carriage 14. When the part 3 is removed from the rails 9 and the rod 5 transferred to the carriage arms, the apparatus is in position to transfer a part 3 onto the change apparatus 19. Thus, the hydraulic cylinder and cable unit 16 is actuated to move the carriage 14 on the tracks 17 to the apparatus 19. With the tracks 17 raised, the rod is aligned with the opening of the hook members 23. As the carriage 14 moves the rod into the hook members 23, the hydraulic cylinder unit 18 is actuated to lower the tracks 17, and thereby the carriage 14 downwardly below the hook members 23 to deposit the rod 5 into the hook members 23. The drive/brake assembly 24 is then actuated one step to transfer the finished part 3 from the transfer location and simultaneously aligning a beam unit 22 having a new part 3 with the dropped and outwardly located carriage 14. At that time, the hydraulic cylinder unit 18 is actuated to raise the carriage and simultaneously the hydraulic unit cylinder and cable unit 16 is actuated to move the carriage from the apparatus 19. The result is that the rod 5 is picked up by the V-shaped openings in the upper ends of the arms 15 and the new or unfinished part 3 is placed in position at the transfer position. In that position, the new part 3 is picked up by the slide unit in rails 9 which move upwardly at the end of a work cycle and place the slide unit into the coating system or line 1.

Generally, in the illustrated embodiment of the invention, the drive/brake assembly 24 is secured to the support frame structure 26 at the interchange location 13 between the coating line and the indexed change or source apparatus 19. The support structure for the chain 20 includes an I-beam 27 vertically oriented and fixedly mounted in the encircling path for the units 21 and includes a straight length I-beam 27 at the location of the carriage 14. The unit 21 includes a plurality of trolley units 28 mounted on the I-beam 27 for transport of the movable load carrier units 21. The endless chain 20 is a link having chain links 29 secured to the trolley mechanism or unit 28, with the chain link having equally spaced openings 29a. Referring particularly to FIGS. 3 and 4, a driven slide member 30 of assembly 24 includes a drive plate 30a having a plurality of coupling drive fingers 31 movable into the chain link openings 29a. The slide member 30 is slidably mounted in a track or rail 32 for linear movement throughout the length of the transfer location. The rail 32 is movable to selectively place fingers 31 into and from coupling or drive engagement with the chain 20 to provide corresponding stepped movement of the chain and interconnected load carrier units 21. The slide rail 32 is movably supported by a plurality of spaced support members 33, 34 and 35. The support members 33-35 are pivotally mounted to the frame structure 26. A hydraulic cylinder unit 36 is coupled to the one middle support member 34 and is operable to pivot the support members and rail 32 for selectively moving the drive fingers 31 into the link openings 29a. In the coupled engaged state, movement of slide member 30 drives the chain unit 20. Retracting of the fingers 31 releases the chain from the drive mechanisms. The support member 33 is a U-shaped unit having rail 32 secured to one side of I-beams 27 and a brake member 37 secured to the opposite side. The brake members 37 includes fingers 38 aligned with the chain link openings 29a. With the chain in the stopped position and engaged with fingers 38, the chain and units 21 are positively held against movement. The brake fingers 38 and the drive fingers 31 are oppositely positioned with respect to the links 29 of the chain unit 20 by unit 36. Thus, with the drive fingers 31 moved into coupling engagement, the brake fingers 38 are simultaneously removed. Conversely, with the drive fingers 31 released from the chain links 29, the brake fingers 38 are moved into engagement with the chain.

In operation, the chain unit 20 is positively driven to locate the carrier unit 21 in appropriate alignment with the U-shaped carriage 14 for interchange of the load carrier members 4 and particularly rods 5 and are positively held in such position by the brake during the interchange and the reverse movement of the drive slide member 30 and the interconnected released fingers 31.

The present invention with the indexed drive of the load carrier unit 21 and the positive holding of the drive mechanism to support the unit 21 in the interchange position has been found to provide a highly effective and reliable automated load interchange apparatus The apparatus readily operates within the time limits required in many work functions and processes. Thus, as more fully disclosed in the co-pending application, a coating line will normally have a cycle time of typically 2 to 3 minutes. It has been found that with the present invention, the part can be readily transferred to the carriage 14 and the source apparatus 19, and a new load applied and returned for insertion into the coating line within the two to three minute working cycle.

The preferred construction of the interchange apparatus 19 is illustrated and more fully described as follows.

Referring particularly to FIGS. 1 and 2, the I-beam 27 is shown as a part of a continuous generally rectangular track structure having curved corners. The portion of the track spaced from the transfer location 13 such a loading station may be formed as a raised portion, not shown, in accordance with required location of other equipment, personnel movement and the like.

Referring to FIGS. 4–6, each of the trolley units 28 for supporting the chain and load carrier units is a dual wheeled member having a pair of oppositely located wheel supports or arms 39 which depend from the beam and are connected to the chain links 29 as by bolt units or other conventional structure. A plurality of the trolleys are provided as necessary to maintain the chain in the proper path and generally include 3 units per load carrier unit 21 with a front, rear and central unit. At the leading or forward trolley unit 28, as shown in FIG. 5, a depending plate 41 is secured to and depends from the arms 39. The lower end of the plate 41 and a further plate 42 are coupled by a rotatable bearing unit 43 having a vertical axis of rotation. The lower end of pivot plate 42 is interconnected to a trolley unit 44 having its wheels mounted within the rigid carrier beam 22 of unit 21. The trolley unit 44 allows relatively movement between the beam 22 and the chain drive system as the beam moves about the rounded or curved corners of the generally rectangular track of I-beam 27. The forward or leading end edge of the I-beam 22 is provided with an end closure plate 45 to positively prevent movement of the beam from the supporting wheeled trolley 46.

As shown in FIG. 6, the opposite end of the beam 22 is directly affixed to a trolley unit 28 as follows. The top center of the I-beam 22 is shown welded as by welds 47 to a plate 48 secured to a bearing unit 43 corresponding generally to the connection provided by plate 42 and bearing 43. Thus, the trailering end of beam 22 can readily follow the track with the forward end having the relative movement provided by the trolley unit 44.

The hook members 23 are plate-like members secured as by welds 49 to the underside of the I-beam 22, with the principal plane located perpendicular to the I-beam. The members 23 are formed with a hook configuration with the bottom leg 50 having the hook configuration and notch 51 to firmly support the load carrier rod 5 during the movement through the apparatus 19.

The chain unit is driven by the drive/brake assembly 24, as previously noted, to provide stepped circulation of the load carrier members or units 21 through the interchange location in synchronism with the coating line or other system used with the apparatus 19.

More particularly, as more clearly shown in FIGS. 3 and 4, the slide rail 32 of assembly 24 is a generally rectangular rail having a slot opening 52 aligned with the chain. The rail 32 is supported by the three longitudinally spaced pivotally mounted support units 33, 34 and 35. The centrally located unit 34 (FIG. 7) includes a generally L-shaped arm or support 53 having a top arm pivotally secured to the top side of the I-beam 27. A depending arm 54 projects downwardly to the outside of the rail 32. The lower end of arm 54 is notched and the rail 32 is secured within the notch as by suitable welds. The hydraulic pivot unit 36 includes a piston rod secured to the lower end of arm 54 with the cylinder of unit 36 secured to the frame structure 26. Actuation of the cylinder unit 36 pivots the support unit 34 and attached rail 32 between a horizontal position and a pivoted outward angled position with respect to the chain unit.

Figure 7:
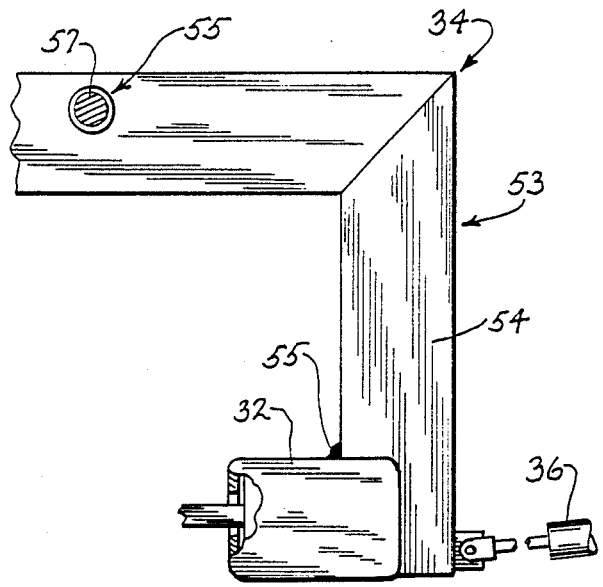
FIG. 7 is an enlarged vertical section taken generally on line 7—7 of FIG. 3.
Figure 8:
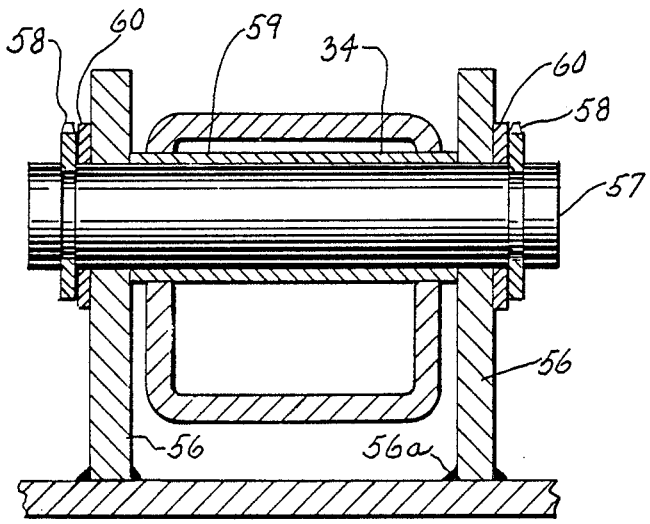
FIG. 8 is an enlarged sectional view taken generally on line 8—8 of FIG. 7.

The pivot connection of the support unit 34 is provided with a low friction pivot unit 55, as shown in FIGS. 7 and 8. In the illustrated embodiment of the invention, a pair of pivot plates 56 are welded to the topside of the I-beam, as by welds 56a. The pivot plates 56 are spaced to freely accommodate the top arm of the L-shaped middle support unit 34. A pivot shaft 57 extends through aligned openings in the pivot plates 56 and the unit 34, and is rotatably mounted and secured to the plates and a pair of end lock rings 58. A sleeve bearing 59 is journaled on the shaft between the plates and end bearings 60 are disposed between the locking rings 58 and the plates 56 to provide a low friction support of unit 34.

Figure 9:
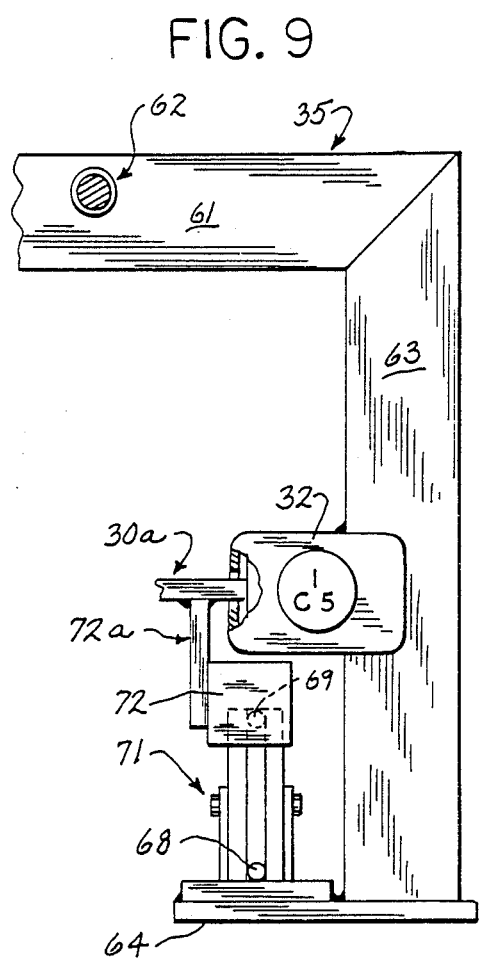
FIG. 9 is a vertical section taken generally on line 9—9 of FIG. 3.

The trailering or upstream support unit 35, as more clearly shown in FIG. 9, is a generally L-shaped member having an upper arm 61. A pivot unit 62, similar to that for the middle unit 34, pivotally supports the unit 35. The one arm 63 of the unit 35 projects downwardly into and past the rail 32. The arm 63 is notched with the rail 32 embedded therein with a welded connection. The bottom end of the arm 63 is spaced downwardly below the bottom edge of the I-beam and above the load carrier unit 21 and beam 22. A plate 64 is secured to the lower end of the depending arm 63 and extends longitudinally therefrom past the middle support unit 34 to the downstream support unit 33 to which it is similarly welded and secured.

The support unit 33, as shown in FIG. 4, is an inverted U-shaped member having a middle top arm 65 which is pivotally mounted to the top side of the I-beam 27 similar to that previously described. A rail arm 66 depends from the top arm 65 downwardly to and past the rail 32. Arm 66 is notched with the rail 32 located therein and welded in place. The rail arm 66 projects downwardly with the lower end secured to the plate 64 in common with the upstream rail support 35.

A hydraulic drive unit 67, shown as a rodless cylinder, is mounted on the plate 64 extending in the path of the chain movement. First and second cables 68 and 69 extend from the opposite ends of the rodless cylinder 67. Similar guide pulleys or wheels 70 and 71 are secured to the opposite ends of the cylinders 67. The cables loop over the adjacent guide wheels 70 and 71 and are secured to a bracket 72, which is secured to the slide member 30. The drive plate which projects from the rail 32 includes a depending plate 72a. The bracket 72 is U-shaped with the base secured to the plate 72a and the arms projecting over the cylinder unit 67. The cables 68 and 69 are connected to the bracket 72. Powering of the cylinder unit 67 provides for selective reverse movement of the cables 68 and 69 with a corresponding linear movement of the slide member 30 and the interconnecting chain coupling fingers 31.

Figure 10:
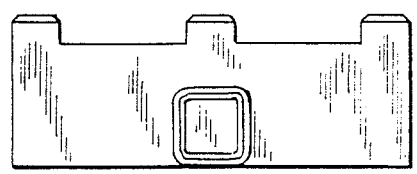
FIG. 10 is a section taken generally on line 10—10 of FIG. 4.

The opposite side of the U-shaped support unit 33 includes a depending brake arm 73 which projects downwardly and outwardly at an angle to the chain unit, as shown in FIGS. 3 and 4. The brake member 37 is secured to the bottom end of the bracket arm 73. In the illustrated embodiment of the invention, the brake plate or member 37 is a plate-like member having the fingers 38 formed on the outer edge. The member 37 is secured to a tubular mounting member 74 telescoped over the arm 73 and welded thereto. The angle of the brake arm 73 locates the brake fingers at an angle equal to the pivot angle of the support unit 33. With the rail arm located in a vertical position, the brake arms 73 and fingers 38 are spaced from the chain link unit. Pivoting of the unit 33 releases the drive fingers 31 and pivots the brake arm 73 to the vertical position. The brake members 37 moves to the horizontal plane with the fingers 38 moving into locking engagement with the chain openings 29a for the holding of the chain in the previously described drive of the assembly. In the illustrated embodiment, as shown in FIGS. 3 and 10, the brake member 37 is an elongated plate spanning at least three openings 29a with three fingers 31 for firm engagement with the chain.

A wear plate 75 is located between the brake member and the chain 29 to isolate the chain structure other than for the link openings from the brake unit. The illustrated wear plate 75 is mounted to an L-shaped member 76 having a horizontal mounting leg secured to the frame structure and a vertical leg 77 adjacent the outer longitudinal path and plane of the chain 29. The separate wear plate 75 is releasably secured to the support leg 77 to provide a replaceable wear surface for proper and optimum guidance of the chain through the brake unit. The wear plate 75 projects vertically beyond the top and bottom of the chain to provide a complete wear surface adjacent the chain structure. The support plate 77 and the wear plate 75 have a corresponding elongated slot 78 corresponding to the length of the brake plate 37 to freely accommodate the brake fingers 38.

Figure 11:
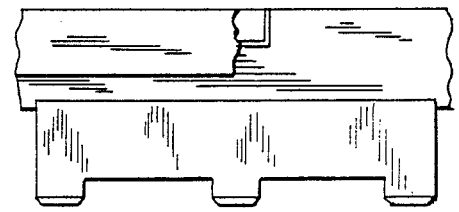
FIG. 11 is a vertical section taken generally on line 11'11 of FIG. 4.

Referring to FIGS. 4 and 11, the slide member 30 is shown as a relatively short tubular channel. The drive plate 30a is secured to a mounting block 79 which in turn is welded to the channel. A suitable guide bearing 80 lines the rail 32 to provide a low friction support of the slide member within the rail 32. The slide member 30 and block 79 essentially compliments the internal configuration of the rail bearing 80.

The actuation of the cylinder unit 67 accurately moves the member 30 and drive fingers 31 in relationship to the chain such that at each end of the system the drive and brake members 30a and 37 and particularly fingers 31 and 38 are accurately located with the lateral openings 29a in the chain links. The brake is set and positively holds the chain in the precise location for the coupling of the drive fingers to the chain at the reset position.

Thus, in operation, the rodless cylinder unit 67 is actuated in timed relation to the movement of the carriage 14. After the carriage 14 has picked up a load carrier member 4 and the associated part 3 from the coating line and moved outwardly, the cylinder unit 67 has indexed the chain 20 and interconnected slide member 30 one step forward. The rail 32 has been held in the pivoted position and the slide member 30 retracted during the period of the work cycle and transfer of the finished part 3 to the carriage 14, with the brake member 37 engaged and positively holding the chain and beam unit 21 in precise desired location. The rodless cylinder unit 16 is actuated to move the carriage 14 to deposit the load carrier and finished part 3 into the aligned beam 22 and particularly hooks 23. The rail pivot cylinder unit 36 is then actuated to pivot the rail to disengage the brake member 38 and to engage the drive member 30a with the chain 29. The rodless cylinder 67 is then actuated to move the slide member 30 forward the one forward step; thereby indexing the chain 20 and attached beams 22 one step. This removes the load carrier unit with the finished part 3 and inserts a new carrier unit 21 with a new part 3 in the transfer location. When the coating line has completed another cycle, the above cycle is repeated to transfer a finished part 3 to the apparatus and insert a new or unfinished part into the coating line.

Figure 12:
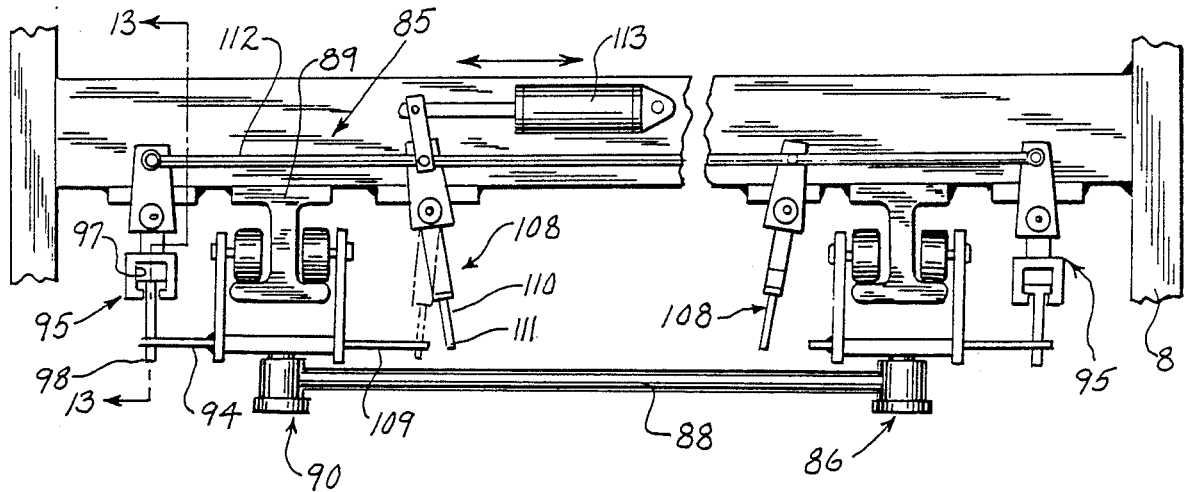
FIG. 12 is an elevational view of an alternate embodiment of the invention.
Figure 13:
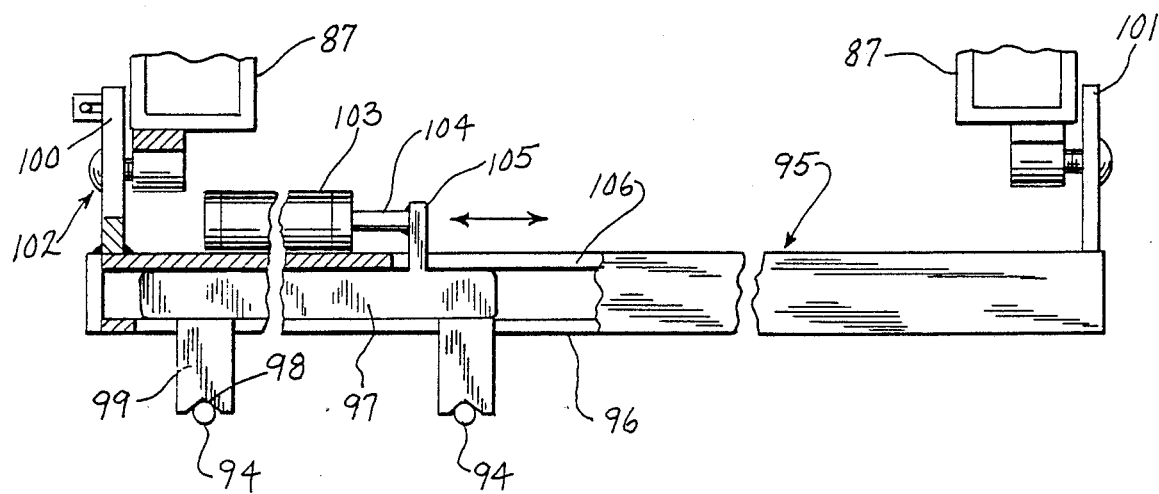
FIG. 13 is a view taken generally on line 13—13 of FIG. 12.

An alternate embodiment of the invention is shown in FIGS. 12 and 13, for transport of a relatively wide load transversely of the principal plane of the load. In this embodiment, a pair of identical trolley units 85 and 86 are secured to a supporting frame structure 87 for supporting of the opposite ends or sides of a wide load or part 88. The support units 85 and 86 are essentially identical systems and unit 85 is described in detail with the corresponding elements of the support unit 86 identified by corresponding primed numbers for simplicity of explanation.

The support unit 85 includes an I-beam 89 secured to the frame structure 87 and defining a linear track in the direction of movement for the wide part 88. A dual wheeled trolley member 90 is mounted on the track 89 with a bottom support 91. Sufficient trolleys are provided in accordance with the depth of the part 88. One end of the load rod 88 is secured to the lower plate or support 91 of trolley member 90 by a suitable bearing unit 92 having a vertical axis of rotation. The opposite end of rod 88 is similarly fixed to the trolley unit 86 to support the rod 88 for movement along the length of the I-beam tracks. The wheeled trolley units 85 and 86 provide a low friction support for the load on the I-beam tracks 89 and 89'.

A plurality of drive fingers or pin 94 are secured to the trolley member 90 and project laterally from the outer side of the I-beam 85 toward the frame structure 87. A slide rail 95 is mounted to the exterior of the I-beam 85 on the frame structure 87 and includes a downwardly opening slot 96. A slide member 97 is mounted in the rails 95 and includes depending coupling plates or forks 98 having edge notches 99 aligned with the pins 94. The slide rail 95 is pivotally mounted to provide selective engagement and disengagement of the coupling plates 98 with the pins 94. In the illustrated embodiment, pivot plates 100 and 101 are similarly secured to the opposite ends of rail 95 and extend upwardly to structure 87. A pivot pin unit 102 secures each plate in place for pivoting about a horizontal axis parallel to the rail 95 for selective vertical orientation of the plates or fork 98, with clockwise rotation disengaging the forks and counterclockwise rotation engaging the forks in FIG. 12.

A cylinder unit 103 is mounted to the top of rail 95 and provides for linear movement of the slide member within the rail. In the second embodiment, the cylinder unit 103 is a conventional hydraulic piston-type cylinder unit, with the piston rod 104 projecting outwardly parallel to the rail. The slide 97 is slidably journaled within the slide rail with a coupling tab 105 projecting upwardly through a slot 106 in the top of rail 95. The piston rod 104 is connected to the coupling tap 105 by a suitable clevis unit such that the actuation of the hydraulic cylinder unit 103 reciprocates the piston rod and attached slide 97 for a corresponding movement of the trolley coupling forks 98.

A brake arm 108 is pivotally secured to the frame structure 87 to the opposite side of the rail 95 and the trolley member 90. Pins 109 are secured to the trolley member 90 and project laterally inwardly between the two support units 85 and 86. A brake plate or fork 110 secured to arm 108 includes a notch 111 for selective engagement with the brake pin 109 for holding of the trolley member 90 in precise location with respect to the rail, as shown in dotted line illustration. The unit pivots outwardly to the full line position 11a as presently described with the drive unit engaged.

The brake unit and the drive unit have the pivot arms or members 100 and 108 connected by a connecting rod 112 for reversible positioning of the coupled forks 98 and 110 with the respect to the corresponding pins 94 and 109. A hydraulic cylinder unit 113 is mounted on structure 87 and coupled to arm 108 and thus to the rod 112 with the appropriate connections to provide the pivotal movement of the lines with the piston rod and rod 112 to provide alternate positioning of the forks 98 and 110.

The opposite support unit 86 is similarly constructed and interconnected by appropriate linkage to the same rod 112 to the support unit 85 just described and to the hydraulic cylinder unit 113.

Thus, as in the first embodiment, the same sequence of functions is provided for the stepped movement of the load secured to or defined by the cross brake or rod 92. With the brake fork 110 released and the drive at the initial starting position with fork 98 engaged, actuation of the hydraulic cylinder unit 103 moves the slide forwardly one step. The hydraulic cylinder unit 113 is actuated to release the drive fork 98 and simultaneously engage the brake fork 110. The cylinder unit 103 is then actuated to reset the drive fork 98 and reset the drive for the next stepped move.

We claim:

1. A load indexing apparatus for precise powered motion of an elongated member, comprising a linear guide unit having a predetermined cross section, a driven unit movably mounted in said guide unit for linear movement therein, a reciprocating drive unit operable between a first position and second position along the path of said guide unit, a coupling connected to said driven unit and to said reciprocating drive unit, a movable support structure connected to said guide unit and operable to move the guide unit laterally to the line of movement of said drive unit, a positioning unit to move said movable support structure, said driven unit having at least one coupling member aligned for selective engagement with the elongated member in said first and second positions, and said driven unit including a first lateral position engaging said elongated member and a second lateral position disengaged from said elongated member for return movement of said driven unit from said second position to said first position, and a brake unit connected to said guide unit and positioned by said guide unit in a first engaged position to hold said elongated member in fixed relation when said driven unit is in said second lateral position.

2. The apparatus of claim 1 wherein said guide unit includes an elongated tubular member, said driven unit includes a member having a cross section corresponding to the internal cross section of said tubular member, said tubular member having a drive slot extending along tis length, said slide member having a drive member projecting outwardly of said slot, said reciprocating drive unit including a hydraulic cylinder unit coupled to said drive member for sliding of said member within the tubular member, said tubular member having a slot in opposed relation to said elongated member, said elongated member having spaced openings aligned with and facing said tubular member in the first pivot position of said tubular member and said slide member including a projecting member aligned with said openings in said first and second positions of said reciprocating drive unit for powered movement of said system.

3. The load indexing apparatus of claim 1 having a machine frame, and wherein said linear guide unit is an elongated rail having a length at least as great as the total stepped movement of the drive unit, said movable support unit including plurality of support members longitudinally spaced along said rial, a pivot unit connected to said support members and said frame structure, a powered operator unit coupled to one of said support members and said machine frame and operable to pivotally position said rail in horizontal alignment with said elongated member and to a second position spaced from said alignment, and said elongated member having said releasable coupling members engaged in said horizontal position, said operator unit pivoting said support unit to said second position to disengage said coupling members and simultaneously engage said brake unit.

4. The load indexing apparatus of claim 3 wherein a second of said movable support units includes a substantially inverted U-shaped arm structure, a pivot unit interconnected to said machine frame and the top of said inverted U-shaped arm structure and pivotally supporting said pivot unit to said machine frame, said arm structure having a first arm aligned with said rail, and means securing said rail to said first arm and providing corresponding pivoted movement of said rail and driven unit, said arm structure having a second arm located to the opposite side of said elongated member, said brake unit secured to said second arm, said brake unit including a releasable coupling with said driven unit and said coupling members disengaged in said first position of said U-shaped support unit and engaged in said second position of said support unit.

5. The load indexing apparatus of claim 4 wherein said second support member is secured to the downstream end of said rail and including a third support member secured to the opposite end of said rail from said U-shaped arm structure, said first support member being interconnected to the center of said rail.

6. The load indexing apparatus of claim 1 wherein said elongated member is a link chain having a equispaced openings, said guide unit is a rail aligned with said chain and spaced in lateral alignment with said chain, said driven unit is a slide member mounted in said rail and having a drive element projecting from said rail, said rail having a slot aligned with said chain and said chain openings, and said slide member having a locking finger projecting through said slot for engagement with said chain, and said brake unit mounted to the opposite side of said chain and having a brake finger for engagement with said chain opening.

7. A load indexing apparatus comprising an elongated beam defining a guide track, a trolley assembly mounted on said track and riding thereon and having a plurality of spaced coupling elements, a load support unit on said trolley assembly, a linear guide unit mounted adjacent said elongated I-beam, a driven unit movably mounted in said linear guide unit, a reciprocating drive unit coupled to said driven unit to position said driven unit between a first position and second position in spaced relation with said linear guide unit, a brake unit movably mounted to the opposite side of said track, each of said driven units and said brake unit including a coupling member aligned with a coupling element of said elongated member and each operable for selective coupling to an aligned coupling element of said elongated member, and means for oppositely positioning said linear guide unit and said brake unit to engage said coupling element of said elongated member to selectively move said driven unit and elongated member and alternately to hold said elongated member in a fixed position during movement of said driven unit within said linear guide unit from said second position to said first position, said guide unit is pivotally mounted to said machine frame, said brake unit being pivotally mounted to said machine frame, said brake unit being an operator unit establishing reciprocating motion, and a linkage interconnecting said operator unit and said pivot support units for said alternate positioning of said linear guide unit and said brake unit.

8. The load indexing apparatus of claim 7 including a duplicate assembly of said beam and trolley units and said linear guide unit and driven unit and said brake unit and said duplicate assembly mounted in laterally spaced relation, a cross beam unit interconnecting said load support units for simultaneously corresponding movement, said linkage connected to each of said linear guide units and each of said brake units to simultaneously and correspondingly position the guide units and the brake units to provide corresponding drive and brake connections to said elongated members.

9. A load indexing apparatus for a stepped endless unit for sequential loading and unloading of an elongated work transfer member, comprising an endless chain unit mounted for movement in a substantially horizontal plane, a plurality of spaced trolley members secured to said chain unit, a plurality of support beams secured to said trolleys for stepped movement with said chain, a pivoted driven unit mounted to said frame structure and pivotal between operative engagement with said chain and from engagement with said chain, a linear reciprocating drive unit for moving of said pivotally mounted driven unit and said engaged chain a predetermined distance, said driven unit mounted for reciprocation and cyclically moving of said chain in accordance with said stepped movement, a pivoted brake unit coupled to said pivoted driven unit and engagable with said chain means and disengagable from said chain means, said brake unit being oppositely pivoted with said driven unit to alternately lock said chain unit against movement with the driven unit disengaged from said chain unit.

10. In the apparatus of claim 9 wherein a plurality of elongated load support members are sequentially transfered to and from a conveyor by a moving carriage, said carriage having an upper support unit with said elongated support members adapted to rest in said support units whereby said support members are adapted to be lifted from said support unit and alternately lowered into the support unit, each of said support beams having a length substantially corresponding to the length of said support members, hook members secured to the beams and depending downwardly therefrom, means movable vertically for placing of a support member in said hook members and alternately for moving of a support member from said hook member, and said driven unit being released from said chain unit with said hook members located to receive or release a support member and said brake unit engaged with said chain during said position of said rail.

11. The apparatus of claim 9 including a single hydraulic operator unit coupled to simultaneously pivot said driven unit and said brake unit to oppositely position said units in engagement and disengagement with respect to said chain unit.

12. The indexing apparatus of claim 9 including a supporting frame structure including an annular support frame, trolley units mounted on said frame and including depending support members, said chain unit secured to said trolley units for support on said annular frame.

13. The apparatus of claim 12 including a pivoted bridge member secured to said frame and extending to the opposite sides of said frame and said chain, said driven unit including a slide rail secured to said bridging member to the first side of said frame and a brake member secured to the second side of said bridging member, a pivot support secured to said frame and said bridging member and having a pivot axis parallel to the frame, and an operator coupled to said bridging member and alternately positioning said bridging member with said driven unit or said brake unit in engagement with said chain unit and trolley units to establish stepped movement of said support beams during forward movement of said reciprocating drive unit and to positively hold said chain unit against movement during the reset of said drive unit.

14. The apparatus of claim 9 wherein a carriage unit including a bottom truck support movably supported on tracks for longitudinal movement of said carriage unit beneath a transfer station and a change station, said carriage including a pair of upstanding vertical plate members projecting upwardly in a plane in closed spaced relation to the sides of said rails, each of said plates including a similar support portions adapted to engage said slide unit cross bars, said plates being vertically movable for lifting and lowering movement with respect to said slide units for selectively removing and placing of a cross bar on said slide units, a support for said tracks include a powered means for vertical movement of said tracks between an inclined position and a horizontal position and controlled to locate said carriage in the horizontal position at said transfer station, and moved between said inclined and horizontal position at said change station, and establishing means relative movement moving said plates and said rails at said transfer location to automatically move a cross bar therebetween at said transfer location and at the change station, and a powered drive unit for selectively moving of said carriage on said tracks between said transfer station and said change station 15. An indexing apparatus for transfer of a work support member between a load and unload location and a transfer location, comprising a supporting frame structure including an annular support frame, an endless drive member rotatably supported in said annular frame, a load member support structure depending from a plurality of identical load support members secured to said endless drive member for equicircumferentially spaced relation, stepped drive means coupled to said endless drive member and operable to sequentially move said endless drive member in a predetermined fixed equal length stepped in equal timed spaced periods and an elongated rigid support member secured to said endless drive member and having a length related to said stepped movement for sequentially alignment with a transfer location on said loop and a corresponding spaced load station on said loop for timed spaced alignment with said spaced stations, a pivoting member secured to said loop frame and extending to the opposite sides of said frame and said endless driven member, a drive means secured to said bridging member to the first side of said bridging member and a brake member secured to the second side of said bridging member, a pivot support for said bridging member having a pivot axis parallel to the frame and a pivot member coupled to said bridging member and alternately positioning said drive unit or said brake unit in engagement with said endless driven member to provide stepped movement of said endless driven member or said load support member to establish stepped movement of said load support member during said stepping movement and to positively hold said support member against movement during the reset of said drive unit.

* * * * *

UNITED STATES PATENT AND TRADEMARK OFFICE
CERTIFICATE OF CORRECTION

PATENT NO. : 4,942,956

DATED : July 24, 1990

INVENTOR(S) : JOHN N. ACKER ET AL

It is certified that error appears in the above-identified patent and that said Letters Patent is hereby corrected as shown below:

Claim 2, column 11, line 66, delete "tis" and substitute therefor ---its---; Claim 3, column 12, line 14, after "including" insert ---a---; Claim 3, column 12, lines 15, delete "rial" and substitute therefor ---rail---; Claim 7, column 13, line 17, after "being" insert ---pivotally mounted to said machine frame---; Claim 10, column 13, line 56, delete "transfered" and substitute therefor ---transferred---; Claim 14, column 14, line 37, delete "portions" and substitute therefor ---portion---.

Signed and Sealed this

Fifteenth Day of September, 1992

Attest:

DOUGLAS B. COMER

Attesting Officer

Acting Commissioner of Patents and Trademarks